United States Patent
Jansen et al.

(10) Patent No.: US 7,712,592 B2
(45) Date of Patent: May 11, 2010

(54) SPRING TRAVEL LIMITER FOR OVERRUNNING ALTERNATOR DECOUPLER

(75) Inventors: Christian Jansen, Etobicoke (CA); John R. Antchak, Innisfil (CA)

(73) Assignee: Litens Automotive Partnership, Woodbridge, Ontario ( * ) Notice: Subject to any disclaimer, the term of this patent is extended or adjusted under 35 U.S.C. 154(b) by 367 days.

(21) Appl. No.: 10/581,097

(22) PCT Filed: Dec. 9, 2004

(86) PCT No.: PCT/CA2004/002094

§ 371 (c)(1), (2), (4) Date: May 31, 2006

(87) PCT Pub. No.: WO2005/057037

PCT Pub. Date: Jun. 23, 2005

(65) Prior Publication Data

US 2008/0108442 A1 May 8, 2008

Related U.S. Application Data

(60) Provisional application No. 60/528,225, filed on Dec. 9, 2003.

(51) Int. Cl.
*F16D 23/00* (2006.01)
(52) U.S. Cl. ............... 192/41 S; 192/81 C; 464/40; 464/60; 474/902
(58) Field of Classification Search ............ 192/41 S, 192/48.3, 55.1, 55.5, 56.2, 81 C; 474/74, 474/902; 464/40, 57–60
See application file for complete search history.

(56) References Cited

U.S. PATENT DOCUMENTS

| 773,320 | A | | 10/1904 | Haase |
| 1,400,368 | A | * | 12/1921 | Brush ................. 464/57 |
| 1,507,921 | A | * | 9/1924 | Karge et al. ........... 464/58 |
| 2,396,985 | A | | 3/1946 | Burrus |
| 2,551,739 | A | | 5/1951 | Harlan |
| 2,633,953 | A | | 4/1953 | Gorske |
| 2,794,524 | A | | 6/1957 | Sacchini |
| 2,829,748 | A | | 4/1958 | Sacchini et al. |

(Continued)

FOREIGN PATENT DOCUMENTS

EP  1279807 A1  1/2003

(Continued)

*Primary Examiner*—Greg Binda
(74) *Attorney, Agent, or Firm*—Harness, Dickey & Pierce, P.L.C.

(57) ABSTRACT

A decoupler assembly for transferring rotary movement between an engine driven shaft and a serpentine belt. The decoupler includes a hub configured to be assembled to the shaft. The hub has a helical first slot formed therein. A pulley is rotatably coupled to the hub. A carrier is mounted on the hub and includes a helical second slot formed therein, as well as an anti-ramp up boss formed thereon. A thrust plate is fixed to the hub and has a slot formed therein. A torsion spring is compressed between a hub end retained in the helical first slot and a carrier end retained in the helical second slot for transferring torque between the hub and carrier. The anti-ramp up boss travels within the slot formed in the thrust plate for limiting rotation between the carrier and thrust plate and preventing rotation of the torsion spring relative to the hub and carrier.

31 Claims, 7 Drawing Sheets

U.S. PATENT DOCUMENTS

| | | | |
|---|---|---|---|
| 2,866,349 A | 12/1958 | Heckenthom | |
| 2,885,896 A | 5/1959 | Hungerford, Jr. et al. | |
| 2,968,380 A | 1/1961 | Sacchini | |
| 3,019,871 A | 2/1962 | Sauzedde | |
| RE25,229 E | 8/1962 | Sacchini | |
| 3,059,493 A | 10/1962 | Wolfram | |
| 3,081,856 A | 3/1963 | Wolfram et al. | |
| 3,249,190 A | 5/1966 | Botnick | |
| 3,298,486 A | 1/1967 | Perryman | |
| 3,618,730 A | 11/1971 | Mould | |
| 3,837,450 A * | 9/1974 | Malion et al. | 192/41 S X |
| 3,844,390 A * | 10/1974 | Lowery | 192/81 C X |
| 4,433,765 A | 2/1984 | Rude et al. | |
| 4,460,076 A | 7/1984 | Yamada | |
| 4,763,764 A | 8/1988 | Smith | |
| 5,139,463 A | 8/1992 | Bytzek et al. | |
| 5,156,573 A | 10/1992 | Bytzek et al. | |
| 5,437,205 A | 8/1995 | Tseng | |
| 5,598,913 A | 2/1997 | Monahan et al. | |
| 5,638,931 A | 6/1997 | Kerr | |
| 5,722,909 A | 3/1998 | Thomey | |
| 5,879,254 A | 3/1999 | Tanaka | |
| 6,044,943 A | 4/2000 | Bytzek et al. | |
| 6,083,130 A * | 7/2000 | Mevissen et al. | 474/74 X |
| 6,152,845 A | 11/2000 | Okada et al. | |
| 6,394,247 B1 | 5/2002 | Monahan et al. | |
| 6,394,248 B1 | 5/2002 | Monahan et al. | |
| 6,637,571 B2 | 10/2003 | Arnold et al. | |
| 6,691,846 B2 | 2/2004 | Titus et al. | |
| 6,761,656 B2 | 7/2004 | King et al. | |
| 7,070,033 B2 | 7/2006 | Jansen et al. | |
| 7,153,227 B2 | 12/2006 | Dell et al. | |
| 7,207,910 B2 | 4/2007 | Dell et al. | |
| 2003/0098214 A1 | 5/2003 | Titus et al. | |
| 2003/0098215 A1 | 5/2003 | Miller et al. | |
| 2004/0014540 A1 | 1/2004 | Dell et al. | |
| 2004/0072641 A1 | 4/2004 | Nakamura | |
| 2004/0104090 A1 | 6/2004 | Jansen et al. | |
| 2005/0250607 A1 | 11/2005 | Jansen et al. | |
| 2006/0144664 A1 | 7/2006 | Antchak et al. | |
| 2006/0148581 A1 | 7/2006 | Jansen et al. | |
| 2006/0264280 A1 | 11/2006 | Dell et al. | |

FOREIGN PATENT DOCUMENTS

| | | |
|---|---|---|
| JP | 10030450 A | 2/1998 |
| WO | WO-0192746 A1 | 12/2001 |
| WO | WO-03104673 A1 | 12/2003 |
| WO | WO 2004/011818 A1 | 2/2004 |
| WO | WO-2004011818 A1 | 2/2004 |
| WO | WO-2004/065811 A1 | 8/2004 |
| WO | WO-2004070225 A1 | 8/2004 |
| WO | WO-2005028899 A1 | 3/2005 |
| WO | WO-2005057037 A1 | 6/2005 |
| WO | WO-2007003052 A1 | 1/2007 |

* cited by examiner

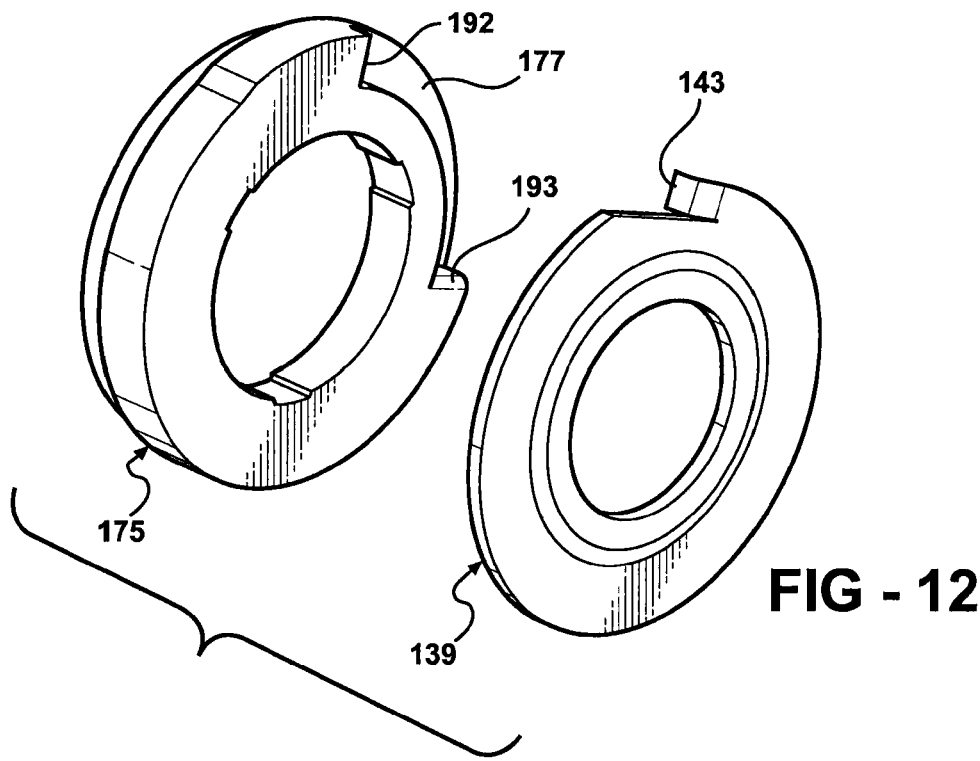
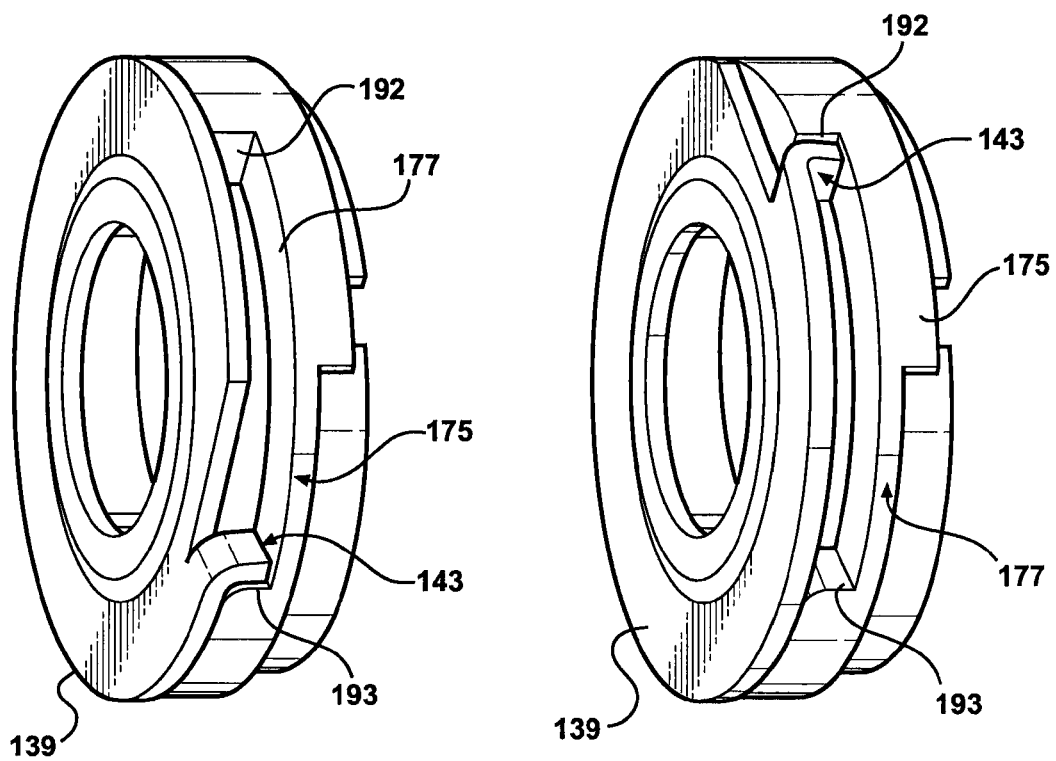
FIG - 12
FIG - 13
FIG - 14

SPRING TRAVEL LIMITER FOR OVERRUNNING ALTERNATOR DECOUPLER

CROSS-REFERENCE TO RELATED APPLICATIONS

This application is a national phase entry of International Patent Application PCT/CA2004/002094 filed Dec. 9, 2004, which claims priority to U.S. Provisional Patent Application No. 60/528,225 filed Dec. 9, 2003.

FIELD OF THE INVENTION

The invention relates to a drive shaft and belt driven component of an automotive vehicle, and more particularly, to a decoupler assembly for the allowing the belt driven component to operate temporarily at a speed different than that of the drive shaft and to decouple or mechanically isolate the driven component from the drive shaft and reduce torsional vibrations therebetween.

BACKGROUND OF THE INVENTION

It is widely known in an automotive vehicle engine to transfer a portion of the engine output to a plurality of belt driven accessory components utilizing an endless serpentine belt. Typically, each component includes a pulley drivingly engaged with the belt and the belt is driven by an output pulley coupled directly to the crankshaft on the engine. The pulley of the component is rotatably mounted to a drive shaft. An example of such a belt driven accessory component is an alternator.

Internal combustion engines operate as a pulse system, constantly accelerating and decelerating and causing engine vibrations. As a result of these changing speeds, the belt driven accessory components, which are driven by the crankshaft, are continually trying to speed up and slow down. This can result in unacceptable levels of noise and vibration along with reduced component durability due to high fluctuating loads and vibrations. Additionally, rapid engine accelerations and decelerations, such as during transmission shifts and engine startup or shutdown, cause belt squeal from slippage between the belt and the pulley, as well as heavy impact loading on the belt.

It is known to provide a decoupler assembly operatively coupled between the pulley and the belt driven accessory component, such as the alternator, to allow the alternator drive shaft to "overrun" or rotate at a faster speed than the pulley and to allow the speed of the pulley to oscillate with respect to the alternator drive shaft due to oscillations in the engine speed. Examples of decouplers are disclosed in the U.S. Pat. No. 6,083,130, issued to Mevissen et al. on Jul. 4, 2000 and the U.S. Pat. No. 5,139,463, issued to Bytzek et al. on Aug. 18, 1992.

It is also known to provide a decoupler between the pulley and the belt driven accessory component to isolate vibrations therebetween reducing noise and impact loads. An example of such a decoupler is disclosed in U.S. Pat. No. 6,044,943, issued to Bytzek et al. on Apr. 4, 2000.

It remains desirable to provide a decoupler that is easier to manufacture and has better durability and functionality over conventional decoupler designs.

SUMMARY OF THE INVENTION

According to one aspect of the invention there is provided a decoupler assembly for transferring torque between a drive shaft and an endless drive element of an automotive engine. The decoupler assembly comprises a hub configured to be fixedly secured to the shaft and extending axially between first and second ends. A pulley is rotatably mounted on the hub and adapted to be drivingly engaged with the endless drive element. A carrier is mounted about the second end of the hub and operatively coupled between the hub and the pulley for selective rotation therewith.

The carrier includes first and second sides and an anti-ramp up boss projecting from one of the sides. A torsion spring extends between the hub and carrier for transferring torque therebetween. A thrust plate is fixedly mounted on the second end of the hub and has a slot formed therein extending between first and second ends for receiving the anti-ramp up boss. The anti-ramp up boss travels within the slot between the first and second ends for limiting rotation between the carrier and the thrust plate while selectively preventing rotational movement of the torsion spring relative to the hub and carrier.

BRIEF DESCRIPTION OF THE DRAWINGS

Advantages of the present invention will be readily appreciated as the same becomes better understood by reference to the following detailed description when considered in connection with the accompanying drawings wherein:

FIG. 12 is an exploded, perspective view of a portion of the decoupler assembly of FIG. 11, illustrating a tabbed thrust plate and a carrier with an anti-ramp up slot;

FIG. 13 is a perspective view of the tabbed thrust plate and the carrier of the decoupler assembly of FIG. 11 in a torque lock-up position; and FIG. 14 is a perspective view of the tabbed thrust plate and the carrier of the decoupler assembly of FIG. 11 in an anti-ramp up position.

DETAILED DESCRIPTION OF THE PREFERRED EMBODIMENTS

Figure 1:
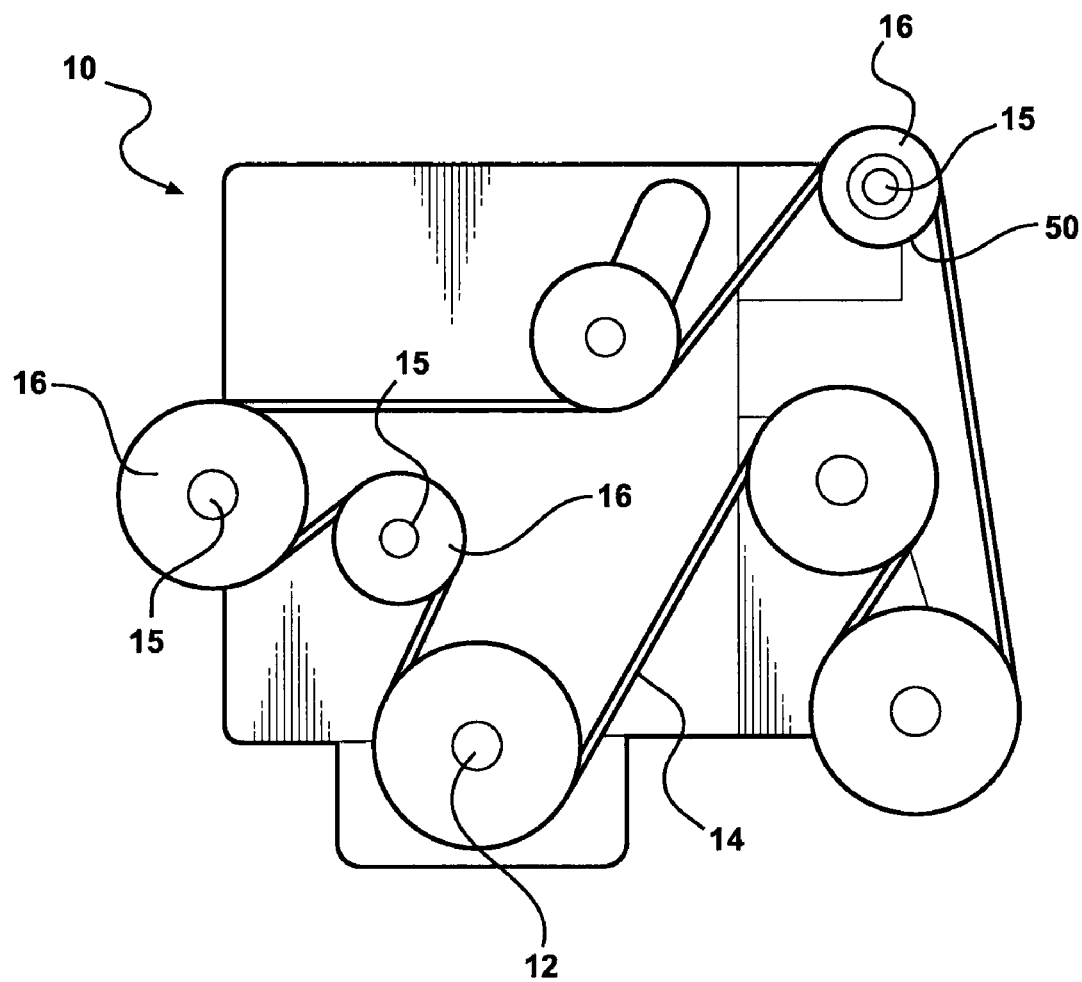
FIG. 1 is a front view of an engine incorporating a decoupler assembly constructed in accordance with the teachings of the present disclosure.

Referring to FIG. 1, an engine for an automotive vehicle is generally indicated at 10. The engine 10 includes a crankshaft 12 driving an endless serpentine belt 14, as commonly known by those having ordinary skill in the art. The engine 10 also includes a plurality of belt driven accessory components 16, such as an alternator, compressor, etc., mounted to a drive shaft 15 and driven by the belt 14. A pulley 50 is operatively coupled to each of the belt driven accessory components 16 for driving the components 16 via rotation of the pulley 50. Described in greater detail below and shown in FIG. 2, a decoupler assembly 20 is operatively assembled between the belt 14 and any one or more of the belt driven accessory components 16 for automatically decoupling the component 16 from the belt 14 when the belt 14 decelerates relative to the component 16 and allowing the speed of the belt 14 to oscillate relative to the belt driven accessory component 16. Additionally, a detailed description of the structure and function of a decoupler assembly can be found in applicant's U.S. Pat. No. 6,083,130, which issued on Jul. 4, 2000 and is incorporated herein by reference in its entirety.

Figure 2:
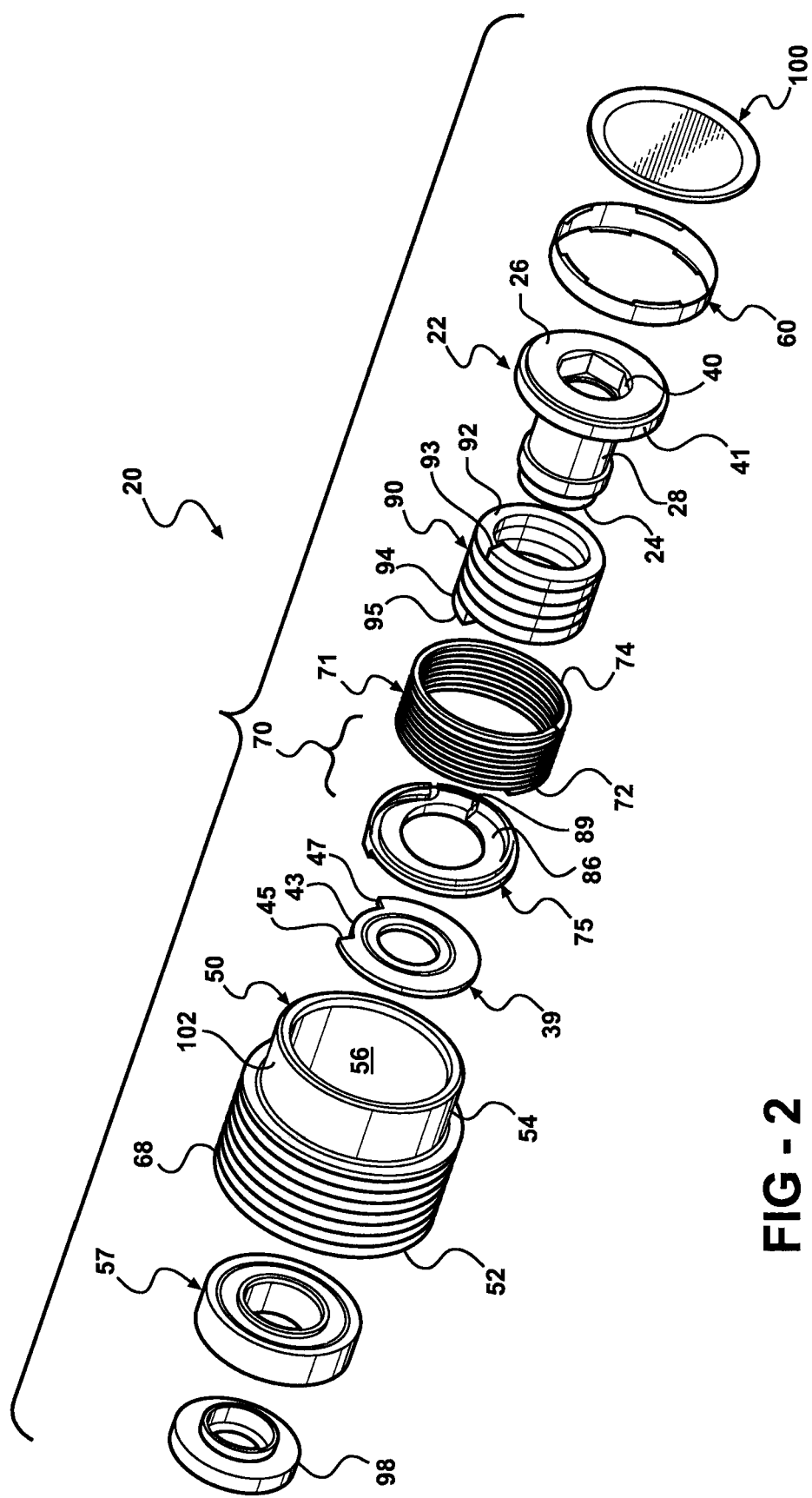
FIG. 2 is an exploded, perspective view of the decoupler assembly of FIG. 1.
Figure 4:
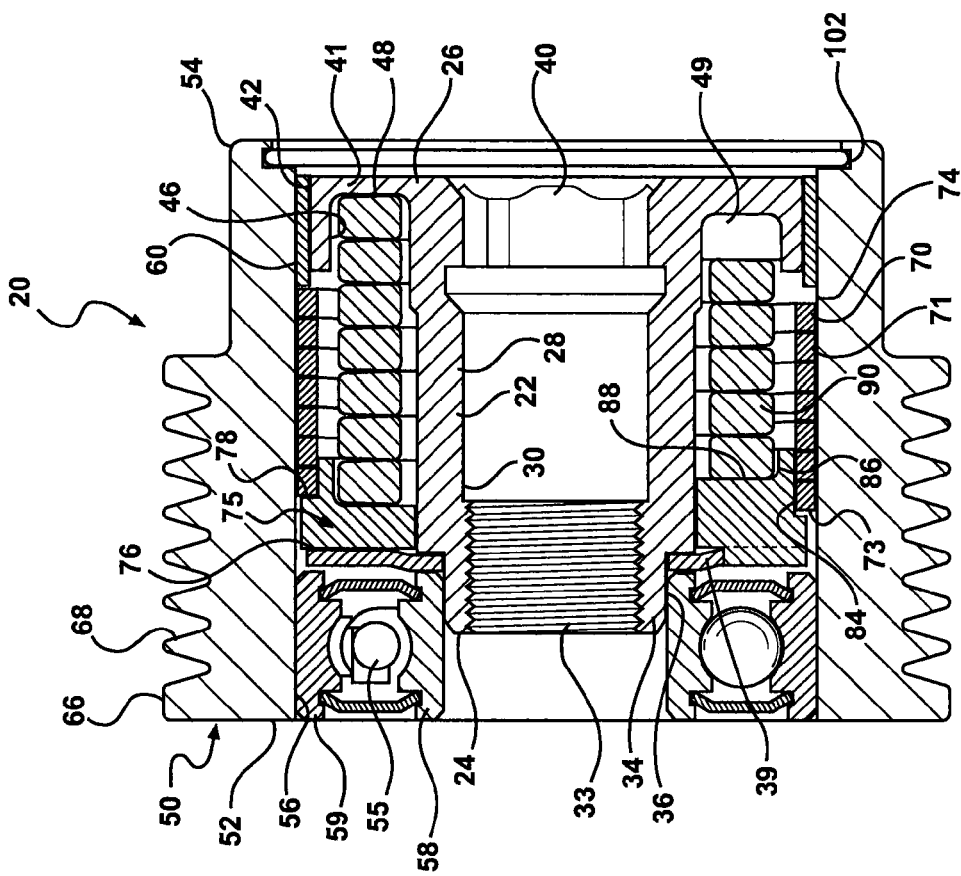
FIG. 4 is yet another cross-sectional view of a portion of the decoupler assembly of FIG. 1.
Figure 3:
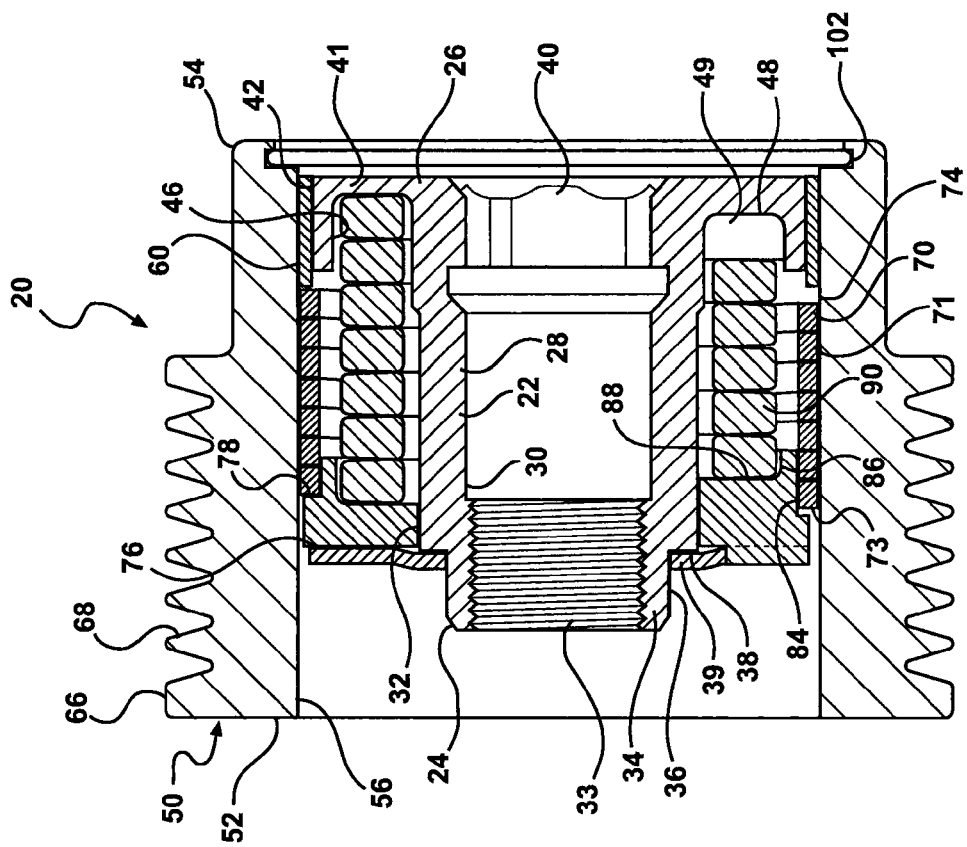
FIG. 3 is a cross-sectional view of a portion of the decoupler assembly of FIG. 1.
Figure 5:
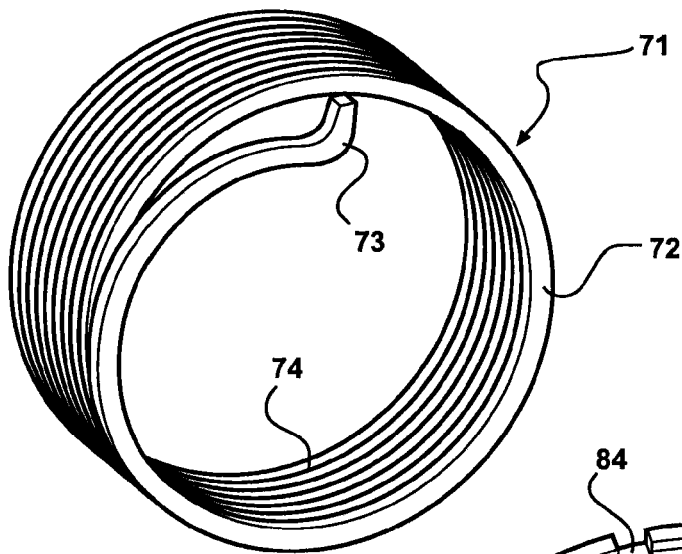
FIG. 5 is a perspective view of a portion of the decoupler assembly of FIG. 1 illustrating a clutch element in more detail.

Referring to FIGS. 2-4, the decoupler assembly 20 includes a hub 22 having opposite first 24 and second 26 ends and a generally cylindrical body 28 extending axially therebetween. The body 28 includes opposite inner 30 and outer 32 surfaces extending between the first 24 and second 26 ends of the hub 22. The inner surface 30 includes a plurality of inner threads 33 adjacent the first end 24 for fixedly securing the hub 22 to the drive shaft 15 for mounting the belt driven accessory component 16. A reduced diameter portion 34 is formed in the first end 24. The reduced diameter portion 34 includes an outer mounting surface 36 having a smaller outer diameter than the outer surface 32 of the body 28. An abutment surface 38 opposite the second end 26 extends generally radially between the outer mounting surface 36 and outer surface 32 of the body 28. An annular thrust plate 39 is seated and fixedly secured, such as by press-fit, on the outer mounting surface 36 against the abutment surface 38. The thrust plate 39 preferably includes a slot, or notch, 43 formed on its peripheral edge to mate with a carrier 75, as will be discussed in more detail below.

A socket 40 is formed in the second end 26 for receiving a suitable tool therein for rotatably threading the hub 22 onto the drive shaft 15 for fixed rotation therewith. An annular first flange 41 extends radially outwardly from the body 28 adjacent the second end 26. The first flange 41 includes an outer flange surface 42 having a larger outer diameter than outer surface 32 of the body 28. A generally helical first slot 46 is formed between the outer flange surface 42 and the body 28 defining a first helically ramped locating surface 48 in the annular first flange 41 terminating at an abutment wall 49 and facing the first end 24 of the hub 22.

A generally cylindrical pulley 50 is rotatably journaled to the hub 22. More specifically, the pulley 50 extends between opposite first 52 and second 54 ends. The pulley 50 includes an inner cylindrical surface 56 extending between the first 52 and second 54 ends. The pulley 50 includes an outer periphery 66 with a plurality of V-shaped grooves 68 formed therein for engaging and guiding the belt 14. A ball bearing member 57 is press fit and coupled between the pulley 50 and the hub 22. The bearing member 57 includes an inner race 58 fixedly secured to a portion of the outer mounting surface 36 of the hub 22 and an outer race 59 secured to a portion of the inner surface 56 adjacent the first end 52 of the pulley 50. A plurality of ball bearings 55 is seated between the inner 58 and outer 59 races of the bearing member 57. The thrust plate 39 is preferably secured in place axially between the inner race 58 and hub 22 when assembled. A cylindrical bushing 60 is journal mounted between the inner surface 56 of the pulley 50 and the outer flange surface 42 of the hub 22.

Referring to FIGS. 2-7, a one-way clutch assembly 70 is operatively coupled between the hub 22 and the pulley 50. The clutch assembly 70 includes a clutch spring 71 and a carrier 75 operatively coupled to the hub 22. The clutch spring 71 includes a plurality of helical coils 72 extending between a bent or hooked proximal end 73 and an opposite distal end 74. Preferably, the clutch spring 71 is formed from an uncoated, spring steel material and has a non-circular cross-section to improve frictional contact with the inner surface 56 of the pulley 50. Most preferably, the cross-section of clutch spring 71 is rectangular or square. The clutch spring 71 is fitted into frictional engagement with the inner surface 56 of the pulley 50. Preferably, a lubricant is applied to minimize wear between the clutch spring 71 and the inner surface 56 of the pulley 50.

Figure 6:
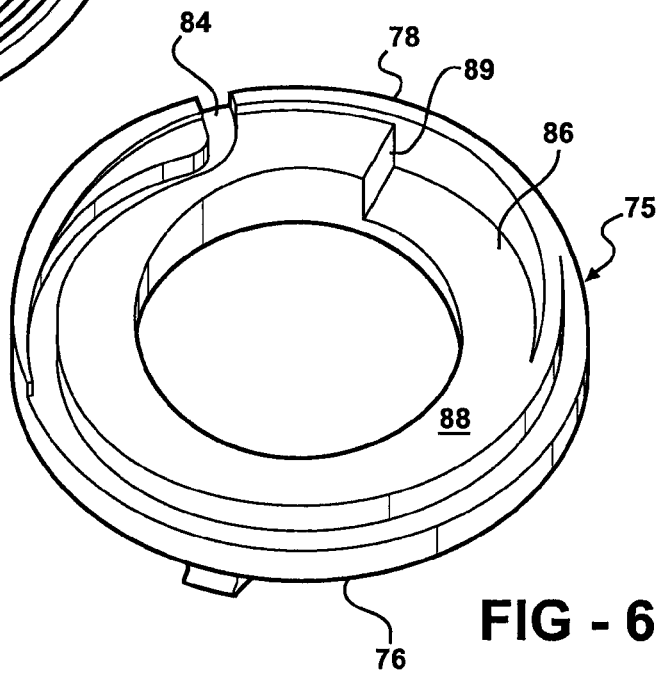
FIG. 6 is a perspective view of a portion of the decoupler assembly of FIG. 1 illustrating a carrier in more detail.
Figure 7:
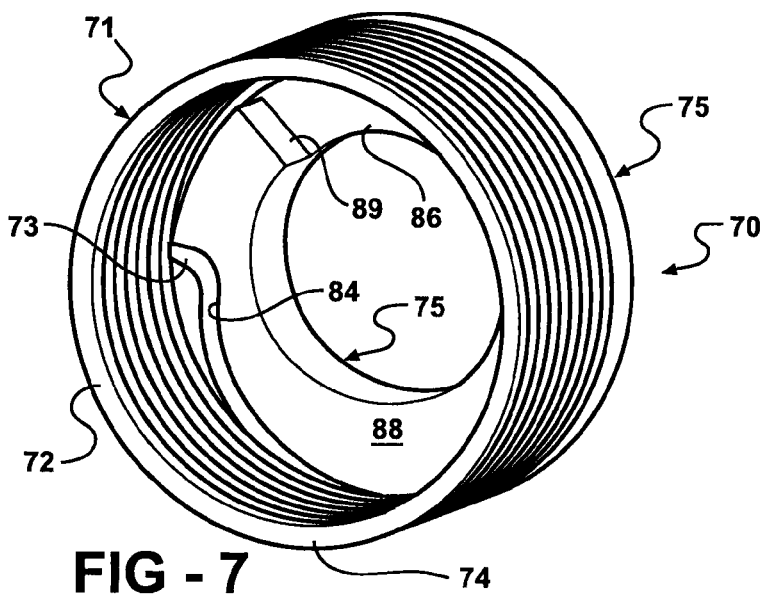
FIG. 7 is a perspective view of a portion of the decoupler assembly of FIG. 1 illustrating th clutch element assembled on the carrier.
Figure 8:
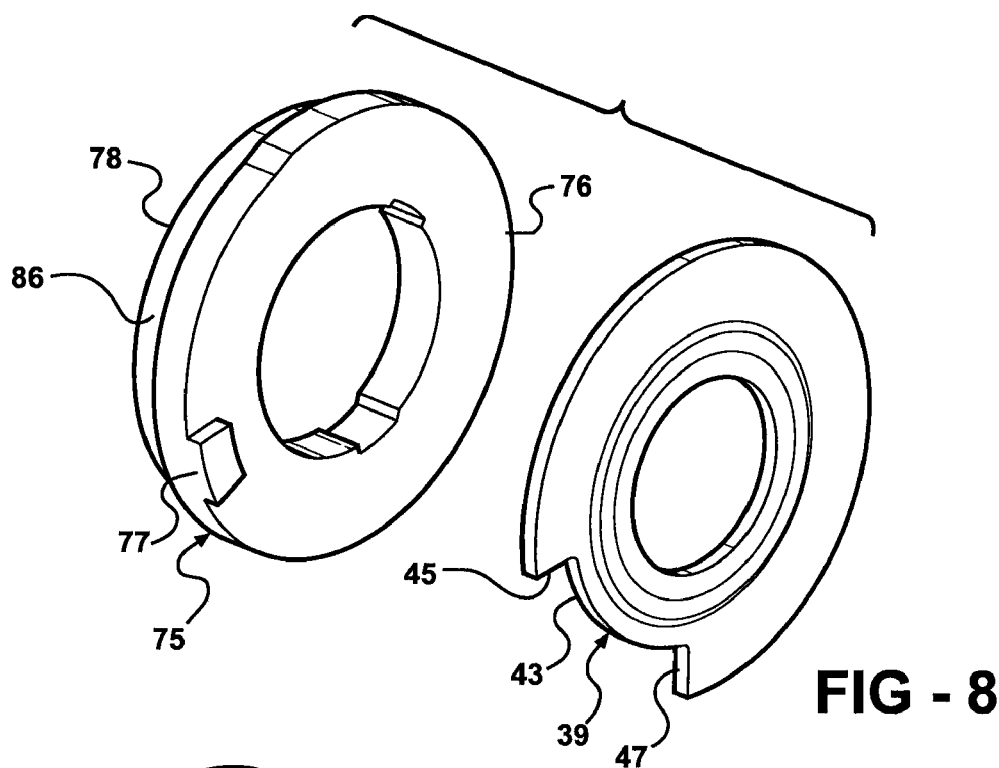
FIG. 8 is a exploded, perspective view of a portion of the decoupler assembly of FIG. 1 illustrating a slotted thrust plate and the carrier with an anti-ramp up boss.

Referring to FIGS. 6-8, the carrier 75 is generally ring shaped and extends axially between opposite first and second sides 76, 78. An anti-ramp up boss 77 is formed projecting outwardly from the first side 76 of the carrier 75 and is configured to mate with the slot 43 formed in the thrust plate 39, when assembled. A hooked slot 84 is formed in the second side 78 of the carrier 75 and is configured to retain the hooked proximal end 73 of the clutch spring 71. A generally helical second slot 86 is also formed in the second side 78 of the carrier 75 defining a second helically ramped locating surface 88 terminating at an abutment wall 89 and generally opposing the first locating surface 48 formed in the hub 22.

Referring to FIGS. 2-4, a helical torsion spring 90 extends between a hub end 92 and a carrier end 94. The torsion spring 90 is axially compressed between the first 48 and second 88 locating surfaces for transferring torque between the hub 22 and the carrier 75. More specifically, the hub end 92 of the torsion spring 90 is retained in the first slot 46 of the hub 22 and seated against the mating helically ramped locating surface 48. Similarly, the carrier end 94 of the torsion spring 90 is retained in the second slot 86 of the carrier 75 and seated against the mating helically ramped locating surface 88. The torsion spring 90 further includes hub distal end 93 and a carrier distal end 95. The hub distal end 93 abuts the abutment wall 49 in the hub 22 and the carrier distal end 95 abuts the abutment wall 89 in the carrier 75 to transfer torque between the carrier 75 and hub 22. Axial forces due to the compression of the torsion spring 90 retains the first side 76 of the carrier 75 in abutting engagement with the thrust washer 39. The torsion spring 90 also allows relative movement between the carrier 75 and the hub 22 to accommodate changes in the speed of the pulley 50 due to generally oscillating changes in the operating speed of the engine. The torsion spring 90 and the clutch spring 71 are coiled in opposite directions.

In prior applications of decouplers, as the torsion spring 90 winds and unwinds due to changes in engine speed, the spring 90 presses against the abutment wall 89 associated with the slot 86 formed in the carrier 75 to transmit torque from the engine. As the driving force associated with the engine reverses, as in an over run condition, the spring 90 attempts to move away from the abutment wall 89 and ramp-up the helical surface 88 as the only forces holding it in place are friction forces between the spring 90 and carrier 75 and the load contained by the compression in the spring 90 between the carrier 75 and the hub 22. Such movement of the spring 90 can cause excessive wear of the carrier 75 and lead to failure of the assembly. Additionally, the overloading of the spring 90 against the abutment wall 89 may also lead to failure of the spring 90.

Figure 9:
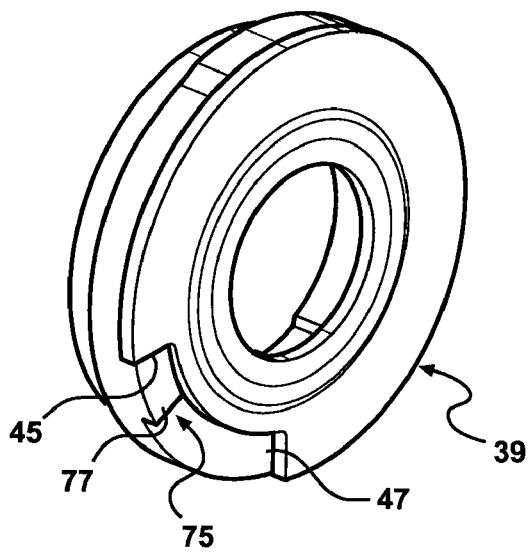
FIG. 9 is a perspective view of the thrust plate and the carrier of the decoupler assembly of FIG. 1 in an anti-ramp up position.
Figure 10:
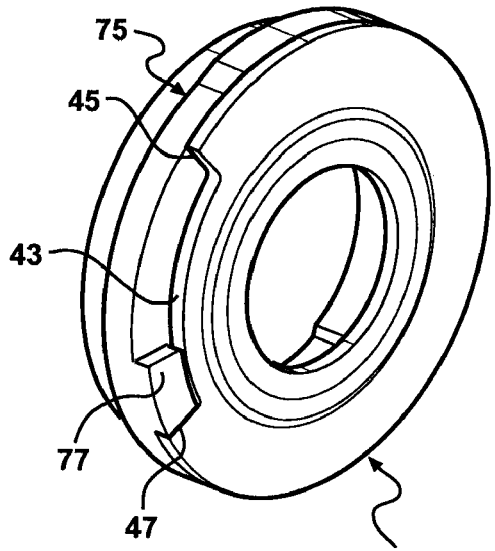
FIG. 10 is a perspective view of the thrust plate and the carrier of the decoupler assembly of FIG. 1 in a torque lock up position.
Figure 11:
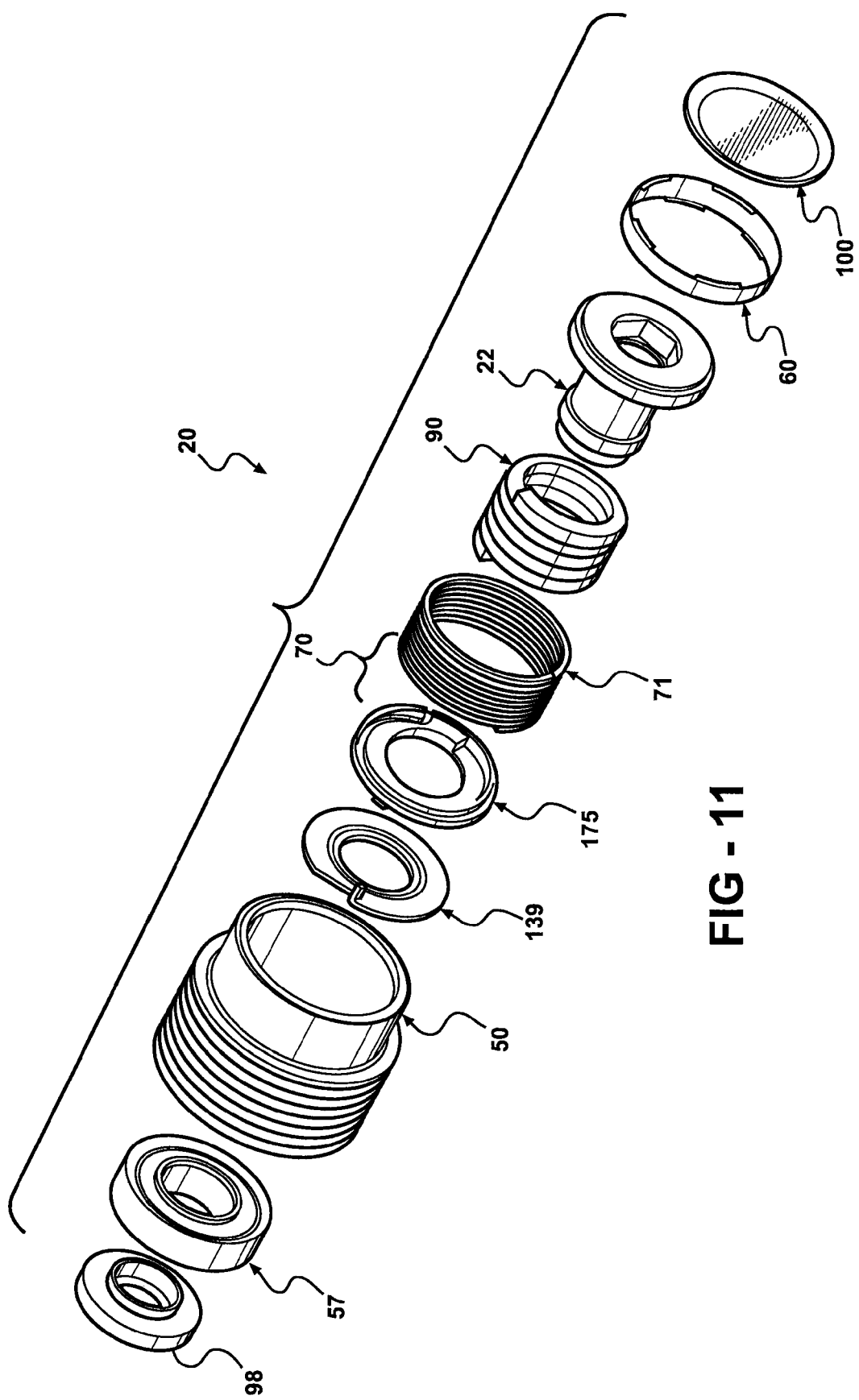
FIG. 11 is an exploded perspective view of another decoupler assembly constructed in accordance with the teachings of the present disclosure.

To alleviate the above outlined problems, the anti-ramp up boss 77 prevents ramp-up or the relative movement of a torsion spring 90 relative to the carrier 75. Specifically, the anti-ramp up boss 77 travels within the slot 43 of the thrust plate 39 as the thrust plate 39 and carrier 75 rotate relative to each other to accommodate changes in speed of the pulley 50. The anti-ramp up boss 77 travels between opposing sides of the slot 43 which define boundaries for a torque lock up position and a ramp-up position. The anti-ramp up position is shown in FIG. 9 and is defined as the position in which the anti-ramp up boss 77 engages a first side 45, or anti-ramp up side, of the slot 43 formed in the thrust washer 39 preventing the spring 90 from backing away from the abutment wall 89 associated with the carrier 75. The torque lock up position of the carrier 75 and thrust plate 39 is shown in FIG. 10 and is defined as the position in which torsional deflection of the spring 90 due to rotation is stopped by the interaction of the anti-ramp up boss 77 with a second side 47, or torque limiting side, of the slot 43 formed in the thrust washer 39.

When assembled, the spring 90 is placed about the body 28 of the hub 22 and compressed against and between the ramped locating surface 48 in the slot 46 of the hub 22 and the ramped locating surface 88 in the slot 86 of the carrier 75, as described above. The carrier 75 and thrust plate 39 are aligned such that the anti-ramp up boss 77 is seated within the slot 43 of the thrust washer 39. The bearing member 57 is then attached to hold the thrust washer 39 in place with respect to the hub 22.

A first cap 98 is assembled to the first end 52 of the pulley 50 and a second cap 100 is assembled to a flange 102 formed in the second end 54 of the pulley 50 for sealing and preventing contaminants from entering the decoupler assembly 20 and for retaining the lubricant within the decoupler assembly 20.

In operation, the engine 10 is started and the pulley 50 is accelerated and rotated in a driven direction by the belt 14 driven by the engine 10. Acceleration and rotation of the pulley 50 in the driven direction relative to the hub 22 creates friction between the inner surface 56 of the pulley 50 and preferably all of the coils 72 of the clutch spring 71. It should be appreciated that the clutch spring 71 will function even where at the onset at least the end coil 74 of the clutch spring 71 is frictionally engaged with the inner surface 56 of the pulley 50. The clutch spring 71 is helically coiled such that the friction between the inner surface 56 of the pulley 50 and at least the end coil 74 would cause the clutch spring 71 to expand radially outwardly toward and grip the inner surface 56 of the pulley 50. Continued rotation of the pulley 50 in the driven direction relative to the hub 22 would cause a generally exponential increase in the outwardly radial force applied by the coils 72 against the inner surface 56 until all of the coils 72 of the clutch spring 71 become fully brakingly engaged with the pulley 50. When the clutch spring 71 is fully engaged with the inner surface 56, the rotation of the pulley 50 is fully directed toward rotation of the drive shaft 15 of the belt driven accessory 16. Additionally, centrifugal forces help to retain the clutch spring 71 in braking engagement with the inner surface 56 of the pulley 50.

The rotational movement of the carrier 75 in the driven direction is transferred to the hub 22 by the torsional spring 90 such that generally the carrier 75, thrust plate 39, hub 22, and the drive shaft 15 from the belt driven accessory 16 rotate together with the pulley 50. At a point where the maximum design torque (or spring twist angle) has been reached, the anti-ramp up boss 77 engages the torque lock up side 47 of the slot 43 in the thrust washer 39 in the torque lock up position described above to prevent over torque on the spring 90 and possible failure. The torque lock up position is a limit for travel of the boss 77 that oscillates between the torque limiting and anti-ramp up positions during normal operation. The boss 77 may contact the anti ramp-up side regularly during normal operation while seldom contacting the torque limiting side. Additionally, the torsional spring 90 resiliently allows relative movement between the carrier 75 and the hub 22 to dampen, or isolate, oscillations in the speed of the pulley 50 due to corresponding oscillations in the operating speed of the engine 10.

When the pulley 50 decelerates, the hub 22 driven by the inertia associated with the rotating drive shaft 15 and the rotating mass within the belt driven accessory 16 will initially "overrun" or continue to rotate in the driven direction at a higher speed than the pulley 50. More specifically, the higher rotational speed of the hub 22 relative to the pulley 50 causes the clutch spring 71 to contract radially relative to the inner surface 56 of the pulley 50. The braking engagement between the clutch spring 71 and the pulley 50 is relieved, thereby allowing overrunning of the hub 22 and drive shaft 15 from the belt driven accessory 16 relative to the pulley 50. The anti-ramp up boss 77 of the carrier 75 engages the anti-ramp up side 45 of the slot 43 formed in the thrust plate 39 in the anti-ramp up position described above, preventing the spring 90 from separating from the abutment wall 89 in the carrier 75 and selectively prevent rotation of the spring 90 relative to the carrier 75 and hub 22. The coils 72 may remain frictionally engaged with the inner surface 56 while the pulley 50 decelerates relative to the clutch assembly 70 and the hub 22. The coils 72 of the clutch spring 71 begin to brakingly reengage the inner surface 56 as the pulley 50 accelerates beyond the speed of the hub 22.

Referring to FIGS. 11-14, there is shown an alternative embodiment of the decoupler assembly 20 of the present invention. The alternative embodiment is identical in all respects to the first embodiment with the exception of the carrier 175 and thrust plate 139. The carrier 175 of the alternative embodiment contains an anti-ramp up slot 177 that mates with a tab 143 formed on the thrust plate 139. The slot 177 extends between a first torque lock-up side 192 and a second anti-ramp up side 193 for limiting the rotational travel of the tab 143 therein and thus the carrier 175 and spring 90 relative to the thrust plate 139. Essentially the slot 43 on the thrust plate 39 and boss 77 of the carrier 75 of the first embodiment have been transposed to the slot 177 of the carrier 175 and the tab 143 of the thrust plate 139 in the alternative embodiment. As with the previously described first embodiment, the tab 143 and slot 177 have torque lock up and anti-ramp up positions as shown in FIGS. 13 and 14 that correspond to those defined above.

It should be appreciated that the decoupler assembly may be coupled between the pulley and drive shaft of any accessory component 16, such as an alternator or compressor, which are driven by the endless serpentine drive element or belt 14. Alternatively, the decoupler assembly may also be coupled between the drive shaft and pulley of the crankshaft which is driven by the engine.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed is:

1. A decoupler assembly for transferring torque between a drive shaft and an endless drive element of an automotive engine, the decoupler assembly comprising:
a hub adapted to be fixedly secured to the shaft, the hub extending axially between a first hub end and a second hub end;
a pulley disposed concentrically about the hub and adapted to be drivingly engaged with the endless drive element;
a bearing between the hub and the pulley, the bearing supporting the pulley for rotation about a rotational axis of the hub;
a carrier rotatably mounted about the second hub end;
a clutch element disposed axially between the hub and the pulley and coupled to the carrier for rotation therewith, the clutch element being configured to transmit rotary power from the pulley to the carrier and to enabling overrunning of the hub relative to the pulley;
a torsion spring extending axially between the hub and the carrier, a first end of the torsion spring being engaged to the carrier, a second end of the torsion spring opposite the first end of the torsion spring being coupled to the hub such that the torsion spring is configured to transfer torque from the carrier to the hub; and
a thrust plate fixedly mounted on the second end of the hub, the thrust plate limiting movement of the carrier in a direction opposite the torsion spring;
wherein one of the carrier and the thrust plate includes an anti-ramp up feature, wherein the other one of the carrier and the thrust plate includes a circumferentially extending slot into which the anti-ramp up feature is received, the slot having a first slot end and a second slot end, the anti-ramp up feature traveling within the slot between the first slot end and the second slot end for limiting rotation between the carrier and the thrust plate.

2. The decoupler assembly of claim 1 wherein the torsion spring is compressed axially between the hub and the carrier.

3. The decoupler assembly of claim 1 wherein the carrier includes a helical first slot formed on an axial face thereof, the helical first slot defining a ramped first locating surface terminating at a first abutment wall and wherein the first end of the torsion spring abuts the first abutment wall.

4. The decoupler assembly of claim 3 wherein the hub includes a helical second slot formed therein concentric about the rotational axis of the hub, the helical second slot defining a ramped second locating surface terminating at a second abutment wall and wherein the second end of the torsion spring abuts the second abutment wall.

5. The decoupler assembly of claim 1 wherein the clutch element is in a first condition that inhibits transmission of rotary power from the pulley to the carrier when the anti-ramp up feature is positioned at the first slot end and wherein the clutch element is in a second condition that facilitates transmission of rotary power from the pulley to the carrier when the anti-ramp up feature is positioned at the second slot end.

6. The decoupler assembly of claim 5 wherein the clutch element is a wrap spring.

7. The decoupler assembly of claim 6 wherein a first end of the wrap spring is fixedly coupled to the carrier.

8. The decoupler assembly of claim 7 wherein the wrap spring directly engages the pulley when the anti-ramp up feature is positioned at the second slot end.

9. The decoupler assembly of claim 8, wherein the anti-ramp up feature is fixedly coupled to the carrier.

10. The decoupler assembly of claim 9, wherein the anti-ramp up feature and the carrier are unitarily and integrally formed.

11. The decoupler assembly of claim 7, wherein the anti-ramp up feature is fixedly coupled to the thrust plate.

12. The decoupler assembly of claim 11, wherein the anti-ramp up feature and the thrust plate are unitarily and integrally formed.

13. The decoupler assembly of claim 12, wherein the slot is formed in an axial end face of the carrier on a side of the carrier opposite the torsion spring.

14. The decoupler assembly of claim 1, wherein the bearing includes a plurality of bearing elements.

15. The decoupler assembly of claim 14, wherein the bearing elements comprise bearing balls.

16. A decoupler assembly for transferring torque between a drive shaft and an endless drive element of an automotive engine, the decoupler assembly comprising:
a hub adapted to be fixedly secured to the shaft, the hub extending axially between a first hub end and a second hub end;
a pulley disposed concentrically about the hub and adapted to be drivingly engaged with the endless drive element;
a bearing between the hub and the pulley, the bearing supporting the pulley for rotation about a rotational axis of the hub;
a carrier rotatably mounted about the second hub end;
a torsion spring extending axially between the hub and the carrier, a first end of the torsion spring being engaged to the carrier, a second end of the torsion spring opposite the first end of the torsion spring being coupled to the hub such that the torsion spring is configured to transfer torque from the carrier to the hub; and
a thrust plate fixedly mounted on the second end of the hub;
wherein one of the carrier and the thrust plate includes an anti-ramp up feature, wherein the other one of the carrier and the thrust plate includes a circumferentially extending slot into which the anti-ramp up feature is received, the slot having a first slot end and a second slot end, the anti-ramp up feature traveling within the slot between the first slot end and the second slot end for limiting rotation between the carrier and the thrust plate; and
wherein a clutch element is disposed between the hub and the pulley for selectively transmitting rotary power from the pulley to the carrier and enabling overrunning of the hub relative to the pulley.

17. The decoupler assembly of claim 16 wherein the clutch element is in a first condition that inhibits transmission of rotary power from the pulley to the carrier when the anti-ramp up feature is positioned at the first slot end and wherein the clutch element is in a second condition that facilitates transmission of rotary power from the pulley to the carrier when the anti-ramp up feature is positioned at the second slot end.

18. The decoupler assembly of claim 17 wherein the clutch element is a wrap spring.

19. The decoupler assembly of claim 18 wherein a first end of the wrap spring is fixedly coupled to the carrier.

20. The decoupler assembly of claim 19 wherein the wrap spring directly engages the pulley when the anti-ramp up feature is positioned at the second slot end.

21. The decoupler assembly of claim 19, wherein the anti-ramp up feature is fixedly coupled to the carrier.

22. The decoupler assembly of claim 21, wherein the anti-ramp up feature and the carrier are unitarily and integrally formed.

23. The decoupler assembly of claim 19, wherein the anti-ramp up feature is fixedly coupled to the thrust plate.

24. The decoupler assembly of claim 23, wherein the anti-ramp up feature and the thrust plate are unitarily and integrally formed.

25. The decoupler assembly of claim 24, wherein the slot is formed in an axial end face of the carrier on a side of the carrier opposite the torsion spring.

26. A decoupler assembly for transferring torque between a drive shaft and an endless drive element of an automotive engine, the decoupler assembly comprising:
- a hub adapted to be fixedly secured to the shaft, the hub extending axially between a first hub end and a second hub end;
- a pulley disposed concentrically about the hub and adapted to be drivingly engaged with the endless drive element;
- a bearing between the hub and the pulley, the bearing supporting the pulley for rotation about a rotational axis of the hub;
- a carrier rotatably mounted about the second hub end;
- a torsion spring extending axially between the hub and the carrier, a first end of the torsion spring being engaged to the carrier, a second end of the torsion spring opposite the first end of the torsion spring being coupled to the hub such that the torsion spring is configured to transfer torque from the carrier to the hub; and
- a thrust plate fixedly mounted on the second end of the hub;
- wherein one of the carrier and the thrust plate includes an anti-ramp up feature, wherein the other one of the carrier and the thrust plate includes a circumferentially extending slot into which the anti-ramp up feature is received, the slot having a first slot end and a second slot end, the anti-ramp up feature traveling within the slot between the first slot end and the second slot end for limiting rotation between the carrier and the thrust plate;
- wherein the torsion spring is compressed axially between the hub and the carrier;
- wherein the carrier includes a helical first slot formed on an axial face thereof, the helical first slot defining a ramped first locating surface terminating at a first abutment wall and wherein the first end of the torsion spring abuts the first abutment wall;
- herein the hub includes a helical second slot formed therein concentric about the rotational axis of the hub, the helical second slot defining a ramped second locating surface terminating at a second abutment wall and wherein the second end of the torsion spring abuts the second abutment wall;
- wherein a clutch element is disposed between the hub and the pulley for selectively transmitting rotary power from the pulley to the carrier and enabling overrunning of the hub relative to the pulley;
- wherein the clutch element is in a first condition that inhibits transmission of rotary power from the pulley to the carrier when the anti-ramp up feature is positioned at the first slot end and wherein the clutch element is in a second condition that facilitates transmission of rotary power from the pulley to the carrier when the anti-ramp up feature is positioned at the second slot end;
- wherein the clutch element is a wrap spring that directly engages the pulley when the anti-ramp up feature is positioned at the second slot end; and
- wherein a first end of the wrap spring is fixedly coupled to the carrier.

27. The decoupler assembly of claim 26, wherein the anti-ramp up feature is fixedly coupled to the carrier.

28. The decoupler assembly of claim 27, wherein the anti-ramp up feature and the carrier are unitarily and integrally formed.

29. The decoupler assembly of claim 26, wherein the anti-ramp up feature is fixedly coupled to the thrust plate.

30. The decoupler assembly of claim 29, wherein the anti-ramp up feature and the thrust plate are unitarily and integrally formed.

31. The decoupler assembly of claim 29, wherein the slot is formed in an axial end face of the carrier on a side of the carrier opposite the torsion spring.

* * * * *